Sept. 29, 1925.  
J. M. KEITH  
TRIMMER  
Filed March 30, 1925    2 Sheets-Sheet 1
1,555,011
Fig. 1.
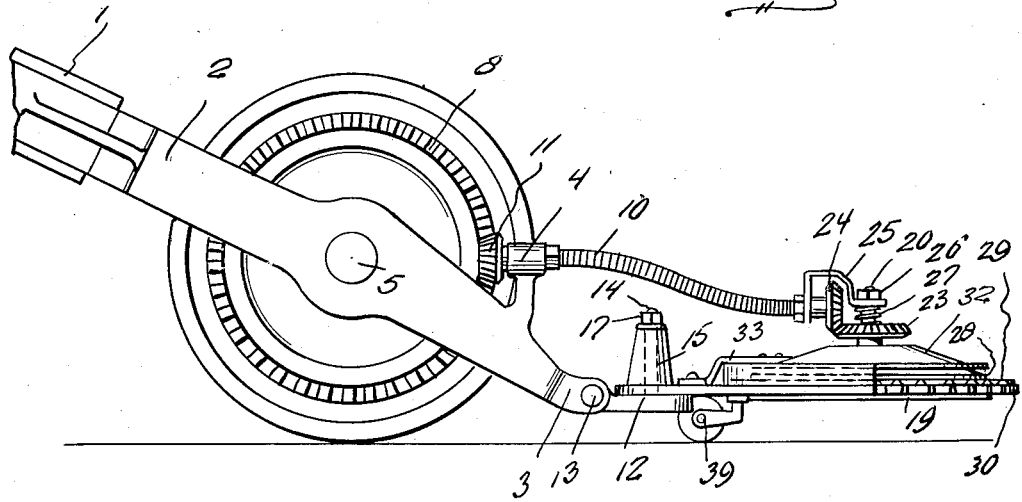
Fig. 2.
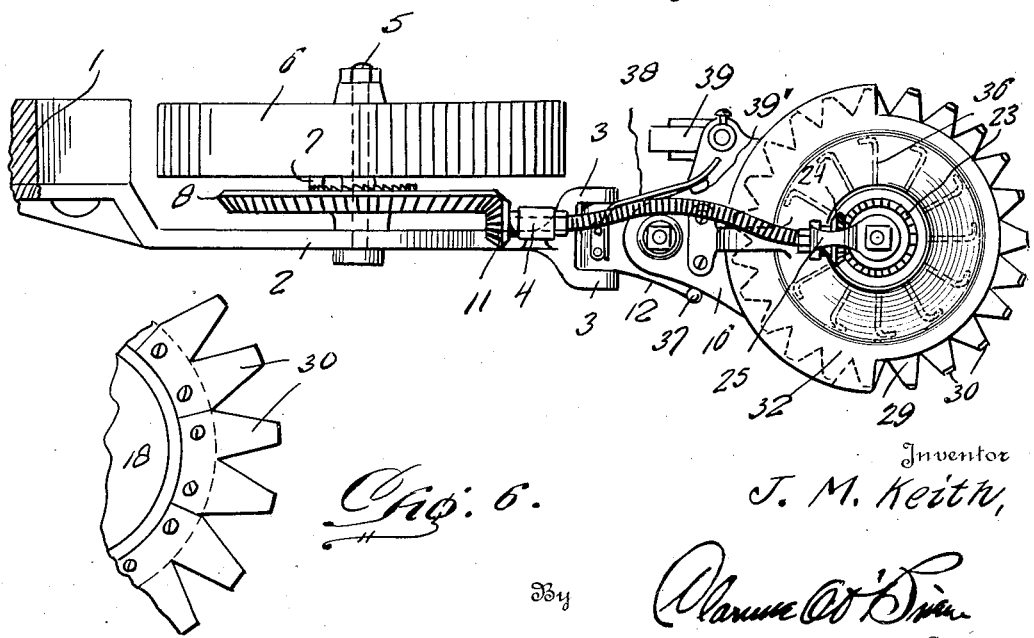
Fig. 6.
Inventor  
J. M. Keith,
By  
Attorney Sept. 29, 1925.  
J. M. KEITH  
TRIMMER  
Filed March 30, 1925

Inventor  
J. M. Keith,

By  
*Clarence O. D....*  
Attorney

Patented Sept. 29, 1925.

1,555,011

UNITED STATES PATENT OFFICE.

JESSE M. KEITH, OF SHELBYVILLE, INDIANA.

TRIMMER.

Application filed March 30, 1925. Serial No. 19,476.

*To all whom it may concern:*

Be it known that I, JESSE M. KEITH, a citizen of the United States, residing at Shelbyville, in the county of Shelby and State of Indiana, have invented certain new and useful Improvements in Trimmers, of which the following is a specification.

The present invention relates to mowers, and more particularly to a trimmer and aims to provide a device, which will prove efficient and reliable in trimming about objects on a lawn, for instance, the monuments in a cemetery.

An important object of the invention is to provide in a trimmer of this nature a rotary cutting member, which has mounted thereon means for creating a suction, which will tend to lean the blades of grass toward the trimmer, thereby greatly enhancing the efficiency of the device, when operating in close quarters.

Another important object of the invention is to provide a cutter which is spring pressed to a predetermined position, so that when the same engages obstacles it will move away from the obstacles, without the necessity of moving the wheel supporting structure.

A still further very important object of the invention is to provide a trimmer of this nature, having an exceedingly simple structure, one which may be manufactured and placed on the market, at a comparatively low cost, and yet be strong, durable, not likely to readily get out of order, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is a side elevation of the trimmer, embodying the features of my invention.

Figure 2 is a top plan view thereof.

Figure 6 is a fragmentary plan view, showing particularly the segmental guard fingers.

Figure 3:
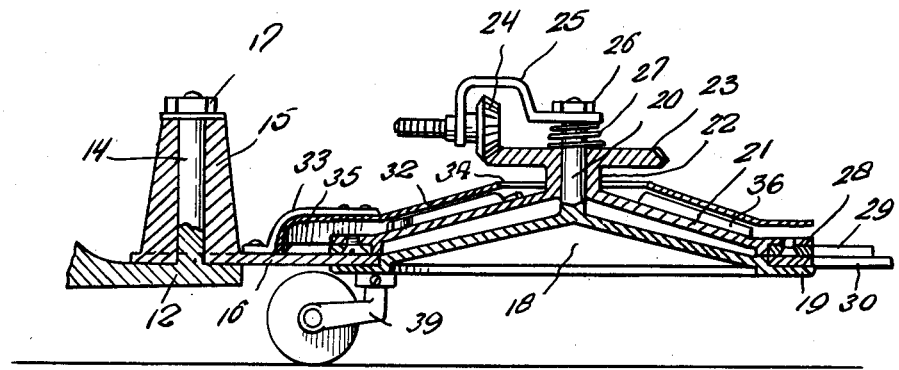
Figure 3 is a longitudinal section through the trimming mechanism.
Figure 4:
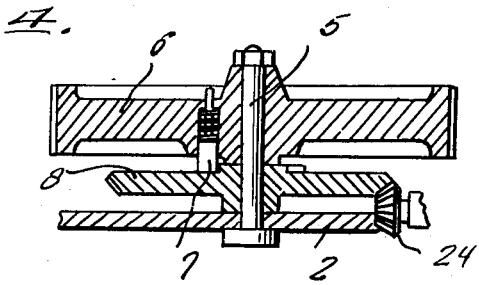
Figure 4 is a horizontal section through the wheeled supporting structure.
Figure 5:
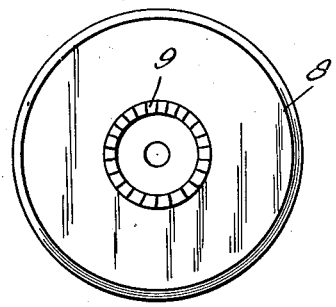
Figure 5 is a plan view of the drive gear.

Referring to the drawing in detail, it will be seen that the invention consists generally of a wheeled supporting structure, a cutting mechanism of the mower type, a universal connection between the cutting mechanism and the wheeled supporting structure, and a driving connection between the wheeled supporting structure and the cutting mechanism.

Considering now particularly the wheeled supporting structure, it will be seen that the numeral 1 designates a handle of any preferred construction, having at its lower end an arm 2, fixed thereto, which terminates in a pair of spaced apertured ears 3. A journal bracket 4, rises from the arm 2, adjacent the ears 3. An axle 5 is mounted in an intermediate portion of the arm 2, extending laterally therefrom, and has mounted thereon a wheel 6. A spring pressed pawl 7 is mounted in the wheel 6, so as to extend laterally therefrom, adjacent the hub. A drive gear 8 is rotatable on the axle 5, and is of the bevelled type. The face of the bevelled gear 8 adjacent the wheel 6 is provided with an annular series of ratchet teeth 9 to be engaged by the pawl 7 so that the bevelled gear 8 will be rotated only when the wheel supporting structure is being moved forwardly. A flexible shaft 10 has one end journaled through the bracket 4, and has fixed on said end a bevelled pinion 11, meshing with the bevelled gear 8, whereby the flexible shaft 10 is rotated as the wheeled supporting structure is moved forwardly.

A plate 12 is pivotally mounted on a pin 13, extending through the apertures in the ears 3, so that it may be swung about the pin. A stud bolt 14 rises from the plate 12 and receives the hub 15, on a plate 16, the nut 17 holding the hub in place on the stud bolt.

A cone shaped bottom 18 is provided, at its base, with an outwardly disposed annular flange 19, and at its apex with a stud bolt 20, projecting upwardly in alignment with the axis of the cone shaped bottom. A portion of the flange 19 is fixed, in any suitable manner, to the plate 16. A cone shaped upper member 21 has a hub 22 formed at its apex, which is rotatable on the stud 20. A bevelled gear 23 is formed on the hub 22, and meshes with a bevelled pinion 24, carried at the end of the flexible shaft 10, this end of the flexible shaft being supported by a bracket 25, mounted on the upper end of the stud 20 and held in place by a nut 26. A spring 27 is disposed about the stud 20, between the bracket 25 and the bevelled gear 23, thereby holding the rotatable cone shaped member 21 downwardly toward the cone shaped member 18. The cone shaped member 21 is provided, at its base, with an outwardly extending annular flange 28, to which may be fixed the segmental series of cutting teeth 29, similar to the segmental series of guard fingers 30, as is shown clearly in Figure 6. The series of guard fingers 30, terminate adjacent the ends of the plates 16, as is indicated to advantage, in Figure 1. A cone shaped hood 32 is mounted to extend over the cone shaped member 21, and is supported in place by a bracket 33, fixed to the plate 16. This cone shaped hood 32 has its apex provided with an opening 34, and a portion of its base edge provided with a flange 35 extending parallel with the stud 20 or concentrically therewith. This flange 35 is provided only on that portion of the hood 32, which is above that portion of the flange 19, on which are mounted portions of the plate 16. This latter mentioned feature is clearly shown in Figure 1.

A series of curved blades 36 are mounted on the upper surface of the cone shaped member 21, and are so disposed as to cause a draft, whereby a suction will be created under the hood 32, drawing air from the base thereof, through the apex opening 34, whereby the blades of grass will be leaned toward the cutting mechanism as it is in operation, so as to insure the proper trimming of the grass, adjacent articles such as the monuments mentioned in the statement of the invention.

The plate 12 is provided with an upwardly extending stop 37. A leaf spring 38 is mounted on the plate 12 and is tensioned to engage a lug 39', on the plate 16, so as to normally hold the plate 16, in engagement with the stop 37. This plate 16 is mounted on a swinging caster 39, so as the trimmer is moved along and the cutting mechanism engages a monument, it will swing away from the stop 37, without interfering with the path of the wheel 6 of the wheeled supporting structure and the spring 38 will hold the cutting mechanism, as close as possible to the object.

It is thought that the construction, operation, and advantages of this invention will now be clearly understood, without a more detailed description thereof. It will be apparent that the present embodiment of the invention, which I have described, by way of example, attains the features of advantage enumerated as desirable, in the statement of the invention and the above description. It will further be apparent that the numerous changes in the details of construction, and in the combination and arrangement of parts, may be resorted to, without departing from the spirit or scope of the invention, as hereinafter claimed, or sacrificing any of its advantages.

Having thus described my invention, what I claim as new is:

1. In combination, a wheeled supporting structure, a plate, a horizontal pivotal connection between the plate and the wheeled supporting structure, a second plate, a vertical pivot between the plates, a stop on the first plate for limiting movement of the second plate, the spring on the first plate engaging the second plate and tending to hold the second plate in abutment with the stop, and a mower trimming mechanism mounted on the second plate.

2. In combination, a wheeled supporting structure, a plate, a horizontal pivotal connection between the plate and the wheeled supporting structure, a second plate, a vertical pivot between the plates, a stop on the first plate for limiting movement of the second plate, the spring on the first plate engaging the second plate and tending to hold the second plate in abutment with the stop, a mower trimming mechanism mounted on the second plate, and a caster supporting wheel swingably mounted on the second plate.

In testimony whereof I affix my signature.

JESSE M. KEITH.